United States Patent

Noguchi et al.

[19]

[11] Patent Number: 5,812,174
[45] Date of Patent: Sep. 22, 1998

[54] DEVICE FOR DRIVING A LASER DIODE AND AN ELECTROPHOTOGRAPHY TYPE IMAGE FORMING APPARATUS USING THE SAME

[75] Inventors: Akio Noguchi, Ebina; Katsuhisa Ogawa, Machida, both of Japan

[73] Assignee: Canon Kabushiki Kaisha, Tokyo, Japan

[21] Appl. No.: 753,469

[22] Filed: Nov. 26, 1996

Related U.S. Application Data

[63] Continuation of Ser. No. 98,866, Jul. 29, 1993, abandoned.

[30] Foreign Application Priority Data

Aug. 3, 1992 [JP] Japan ................................. 4-206479

[51] Int. Cl.$^6$ .......................................................... B41J 2/47
[52] U.S. Cl. ............................................. 347/237; 347/247
[58] Field of Search .................................. 347/237, 243, 347/247

[56] References Cited

U.S. PATENT DOCUMENTS

| | | | |
|---|---|---|---|
| 4,814,791 | 3/1989 | Ohara et al. ............................. | 347/247 |
| 5,099,192 | 3/1992 | Thayer et al. ............................ | 347/237 |
| 5,126,759 | 6/1992 | Small et al. .............................. | 347/237 |
| 5,166,702 | 11/1992 | Mattern et al. .......................... | 347/237 |

*Primary Examiner*—Mark J. Reinhart
*Attorney, Agent, or Firm*—Fitzpatrick, Cella, Harper & Scinto

[57] ABSTRACT

An apparatus has a plurality of semiconductor cells as current switchings for driving a laser diode which exposes to light a photosensitive member so as to effect image recording. The semiconductor cells have each different characteristics, or same characteristics respectively. In response to the light amount signal corresponding to light quantity of the laser diode, a selector selects one or more of the semiconductor cells so as to supply a suitable driving current turned on or off later with an image signal. As a result, no fluctuations in the pulse duty ratio and the rise time are present in the entire driving current active range, thus improving the quality of a recorded image. The effect of selection by the selector is held for a certain recording time, whereby malfunction due to noises or the like can be avoided, and stable actions of the laser diode are ensured.

28 Claims, 14 Drawing Sheets

DEVICE FOR DRIVING A LASER DIODE AND AN ELECTROPHOTOGRAPHY TYPE IMAGE FORMING APPARATUS USING THE SAME

This application is a continuation of application Ser. No. 08/098,866 filed Jul. 29, 1993, now abandoned.

BACKGROUND OF THE INVENTION

1. Field of the Invention

The present invention relates to a device for driving a laser diode, and more particularly, to an electrophotography type image forming apparatus using the device. The image forming apparatus includes not only a printer, but also a facsimile and a copying machine, etc.

2. Description of the Related Art

A typical construction of an image forming apparatus called a laser beam printer is illustrated in FIG. 1. An image signal (VDATA signal) 101 inputs into a laser unit 102, which emits a laser beam 103 ON-OFF modulated in response to the VDATA signal. A motor 104 rotates a rotary polygon mirror 105 at a constant speed, to deflect the laser beam 103, generating a laser beam 107. An image formation lens 106 focuses the laser beam 107 on a photosensitive drum 108. Thus, the laser beam 107 modulated with the image signal 101 is scanned horizontally (in a direction of main scanning) on the photosensitive drum 108. A beam detector 109 has a photoelectric conversion element 110 (e.g. a photodiode), and generates a horizontal synchronizing signal (BD signal) 111 which serves for an image write timing. A latent image formed on the photosensitive drum 108 is visualized as a toner image by a developing device (not shown). The toner image is transferred to a printing paper 112 by a transfer printing device (not shown).

The actions of these respective parts will be described. The laser unit 102 generates a laser beam 103 modulated in response to the image signal 101 supplied. The VDATA signal 101 is produced by a controller (not shown) disposed in the laser beam printer. The modulated laser beam 103 is deflected by the polygon mirror 105 having a plurality of mirror surfaces which makes a constant-speed rotation and which is driven by the motor 104. The deflected laser beam 107 is scanned with a constant-speed on the photosensitive drum 108.

The laser beam 107 is also focused on the photosensitive drum 108 by the image formation lens 106. When the photosensitive drum 108 is rotated at a constant speed and the laser beam 107 is scanned at a constant speed, the latent image based on the VDATA signal 101 is formed on the photosensitive drum 108. At this time, the laser beam 107 is incident on the photoelectric conversion element 110 of the beam detector 109 fixed in the neighborhood of a starting point for scanning. This incident induces the generation of BD signal 111 from the beam detector 109. In synchronism with the BD signal 111, the controller generates VDATA signal 101 corresponding to one scanning operation, thereby limiting the image position in the direction of main scanning on the photosensitive drum 108.

Next, a signal for forming an image will be described by reference to FIG. 2. BD signal 111 is a synchronizing signal in the main scanning direction, as above-mentioned. FIG. 2 shows an output timing in the main scanning direction (i.e. horizontal direction) with respect to the printing paper 112. When image signal 101 is generated at a time of $t_1$ after the rise of BD signal 111, an image is formed in a position at a distance of $D_1$ from the left end of the printing paper 112. As above-described, it is needless to say that the laser beam 107 does not directly form an image on the printing paper 112, but is merely focused on the photosensitive drum 108 so as to create a latent image.

The image signal 101 is generated by an image processing unit (not shown), such as an image processor, which is different from the controller for controlling the sequence of image formation. The controller masks the image signal 101 by means of an image mask signal 113 so that no exposure will occur even if the image processing unit turn on the image signal 101 within outside of the image range (i.e. areas other than $D_2$ of FIG. 2). As aforementioned, the BD signal 111 is a signal to be generated when the laser beam 107 scans on the beam detector 109. Hence, the controller needs to light the laser forcibly at a time when the laser beam 107 is expected to scan on the beam detector 109. A signal for this force-lighting is an unblanking signal 114 (shown in FIG. 2).

The above-mentioned mask signal 113 and unblanking signal 114 are generated by counting a system clock 124 as shown in FIG. 3.

An explanation will now be described with reference to FIG. 3. BD signal 111 from the beam detector 109 is shaped by a waveform shaping circuit 123 into a pulse waveform comparable to that of one pulse of the system clock 124. This shaped BD signal serves to clear a main scanning counter 122. The main scanning counter 122 counts up while synchronizing with the system clock 124, and is cleared every time a pulse of the BD signal inputs. Therefore, the current scanning position of the laser beam can be recognized by knowing the counter value of the main scanning counter 122.

A register 115 for generating an unblanking start signal and a register 116 for generating an unblanking end signal latched unblanking start data or unblanking end data, respectively, via data lines 127, 128. Strobe pulses 125, 126 are trigger pulses for latching these data into the two registers 115, 116, respectively. The contents (i.e. data) latched in the registers 115, 116 are compared with those contents of the main scanning counter 122 by comparators 117, 118. As a result, the unblanking start signal 129 outputs from a gate 119, and the unblanking end signal 130 outputs from a gate 120, to a flip-flop 121. The flip-flop 121 creates an unblanking signal 114 from these signals 129, 130, as shown in FIG. 4.

The image mask signal 113 can also be generated by a circuit of the same structure as that of the aforementioned circuit for generating the unblanking signal 114 illustrated in FIG. 3.

In the above description regarding FIG. 1, it has been described that the laser unit 102 is driven with ON-OFF driving by the image signal 101 in order to simplify explanation. In fact, however, the image signal 101 needs to take a logical product and a logical sum relative to the image mask signal 113, the unblanking signal 114, and a laser force lighting signal 131 until the image signal 101 reaches the laser unit 102. By these actions, the image signal 101 can be formed only within the image range $D_2$ shown in FIG. 2. The resulting laser lighting signal 132 is supplied as a drive signal for the laser unit 102. The laser force lighting signal 131 is a signal with which the controller turns on the laser forcibly.

Next, an automatic power control (APC) will be described. The relationship between an electric current supplied to a laser chip and an optical output produced from it differs from each of chips, and also varies depending on the heat evolution of the chip itself. Thus, a constant current control with mere open loop cannot emit laser light. It is necessary to monitor the optical output of the laser and control the laser driving current in response to the level of optical output so that the desired optical output level will be obtained. This type of control is called the APC.

Moreover, details of the APC will be explained. FIG. 6 shows the structure of a laser control circuit. This laser control circuit consists of a current stabilizer 133, a switching circuit 135, and an amplifier 138. The current stabilizer 133 is a voltage-current converter, which flows an electric current $I_1$ corresponding to a light amount signal 134 (i.e. an APC voltage) from the controller. A circuit for switching this current with a laser lighting signal 132 is the switching circuit 135 as above mentioned. Responsive to this action of the switching circuit 135, a laser diode 136 emits light. The quantity of this laser light emission is taken out by a photodiode 137 as a current volume, and this current volume is converted by a resistor 140 into a voltage volume. The quantity of light emission taken out as the voltage volume is amplified by the amplifier 138 to become an emission volume signal 139 representing an intensity of the light emitted from the laser diode 136. The controller raises the level of the light amount signal 134 in response to the level of the emission volume signal until the desired value is obtained, while monitoring the emission volume signal 139.

FIG. 7 illustrates a control procedure for the above-described APC operation. This control is performed in the following manner: First, the laser force lighting signal 131 shown in FIG. 5 is made active, and then the emission volume signal 139 of FIG. 6 is monitored (S1). If the value of the emission volume indicated by the signal 139 is lower than the desired value, the level of the light amount signal 134 is raised by one step (S2). If the value of the emission volume is higher than the desired value, on the contrary, the level of the light amount signal 134 is lowered by one step (S3). If the quantity of light emission is identical with the desired value, the APC operation is concluded. During this APC operation, a laser beam scans portions corresponding to an arrows shown in FIG. 8 in a positional relationship with the printing paper 112.

The APC is performed first of all in the image formation procedure, and also in case a plurality of sheets are printed continuously, the APC should be performed in a period corresponding to a space between a preceding sheet and a succeeding sheet.

Alternatively, as shown in FIG. 9, there is a method of the APC by which the APC may be performed outside the image range. This method is carried out in cases where the light quantity (light intensity) level by each of scanning lines should be ensured, or in cases where the generation of latent image lines between sheets as shown in FIG. 8 adversely affects image formation or the like. According to this method, the aforementioned unblanking period is used to generate the unblanking signal 114 by each of scanning lines, as shown in FIG. 10, whereby the laser lighting signal 132 is generated. Thus, the emission volume signal 139 arisen out at the starting point of unblanking as illustrated in FIG. 10.

In the above-described prior art examples, however, the switching circuit 135 for the laser diode 136 shown in FIG. 6 consists of a pair of current drivers. Hence, if the entire driving current active range (10 mA to 120 mA) of the laser diode 136 is covered, the switching circuit 135, especially in the small-current range, is influenced by an internal device parasitic capacity of the integrated circuit (IC), thus posing the following disadvantages:

(a) The pulse duty ratio varies in the small-current range.

(b) The rise time is delayed in the small-current range.

These deteriorations become notability, particularly, in proportion to the speeding up of video data (laser lighting signal 132) which is a digital signal. This will exert a direct adverse effect on half-tone reproduction and a smoothing process. Consequently, there arise problems such that image quality is remarkably lowered.

In order to solve the above-mentioned problems associated with the prior art, it is an object of the present invention provide an image forming apparatus which enables stable driving of a laser diode free from fluctuations in the pulse duty ratio and the rise time over the entire driving current active range of the laser diode.

SUMMARY OF THE INVENTION

To meet the above object, one aspect of the present invention provides; an image forming apparatus having a light source for generating a light beam modulated with an image signal, the apparatus comprising: a plurality of semiconductor cells for switching a driving current flowing into the light source; and selection means for selecting one or more of the plurality of semiconductor cells.

Another aspect of the present invention provides; a light quantity controller (light intensity controller) having a light source for generating a light beam modulated with an information signal, the device comprising:

a plurality of semiconductor cells for switching a driving current flowing into the light source; and selection means for selecting one or more of the plurality of semiconductor cells.

According to a feature of the invention, the selection means may select one or more of the plurality of semiconductor cells in response to the driving current flowing into the light source.

According to a feature of the invention, each of the plurality of semiconductor cells may have different characteristics corresponding to different driving currents flowing into the light source, and the selection means may select some one semiconductor cell having characteristics responsive to the driving current flowing into the light source from among the plurality of semiconductor cells.

According to the present invention, the selection means selects one of a plurality of semiconductor cells for switching a driving current for the light source whose characteristics are different individually (e.g. optimized in advance individually) according to the different values of the driving current flowing into the laser diode. Alternatively, the present invention uses a plurality of identical semiconductor cells (e.g. whose characteristics are optimized previously according to a predetermined value of driving current flowing into the laser diode), and the selection means selects one or plural of the semiconductor cells in a selected combination according to the value of the driving current flowing into the laser diode.

Thus, the present invention enables stable driving of a laser diode free from fluctuations in the pulse duty ratio and the rise time over the entire driving current active range of the laser diode. As a result, an image forming apparatus can be accomplished which involves an optimized smoothing process, improved half-tone reproducibility, and high image quality.

Furthermore, the results of selection by the selection means are retained during control of recording for a recording medium. Consequently, wrong operations due to noises or the like can be avoided, and the drive cell during the control of recording for the recording medium is fixed. Moreover, it becomes possible to perform stable driving of a laser diode without causing fluctuations in the pulse duty ratio and the rise time over the entire driving current active range of the laser diode.

The above and other objects, effects, features and advantages of the present invention will become more apparent from the following description of embodiments thereof taken in conjunction with the accompanying drawings.

BRIEF DESCRIPTION OF THE DRAWINGS

Embodiments of the invention will now be described, by way of example, and with reference to the accompanying drawings in which.

DETAILED DESCRIPTION OF PREFERRED EMBODIMENTS

Embodiments of the present invention will now be described in detail below with reference to the accompanying drawings.

<First embodiment>

Figure 11:
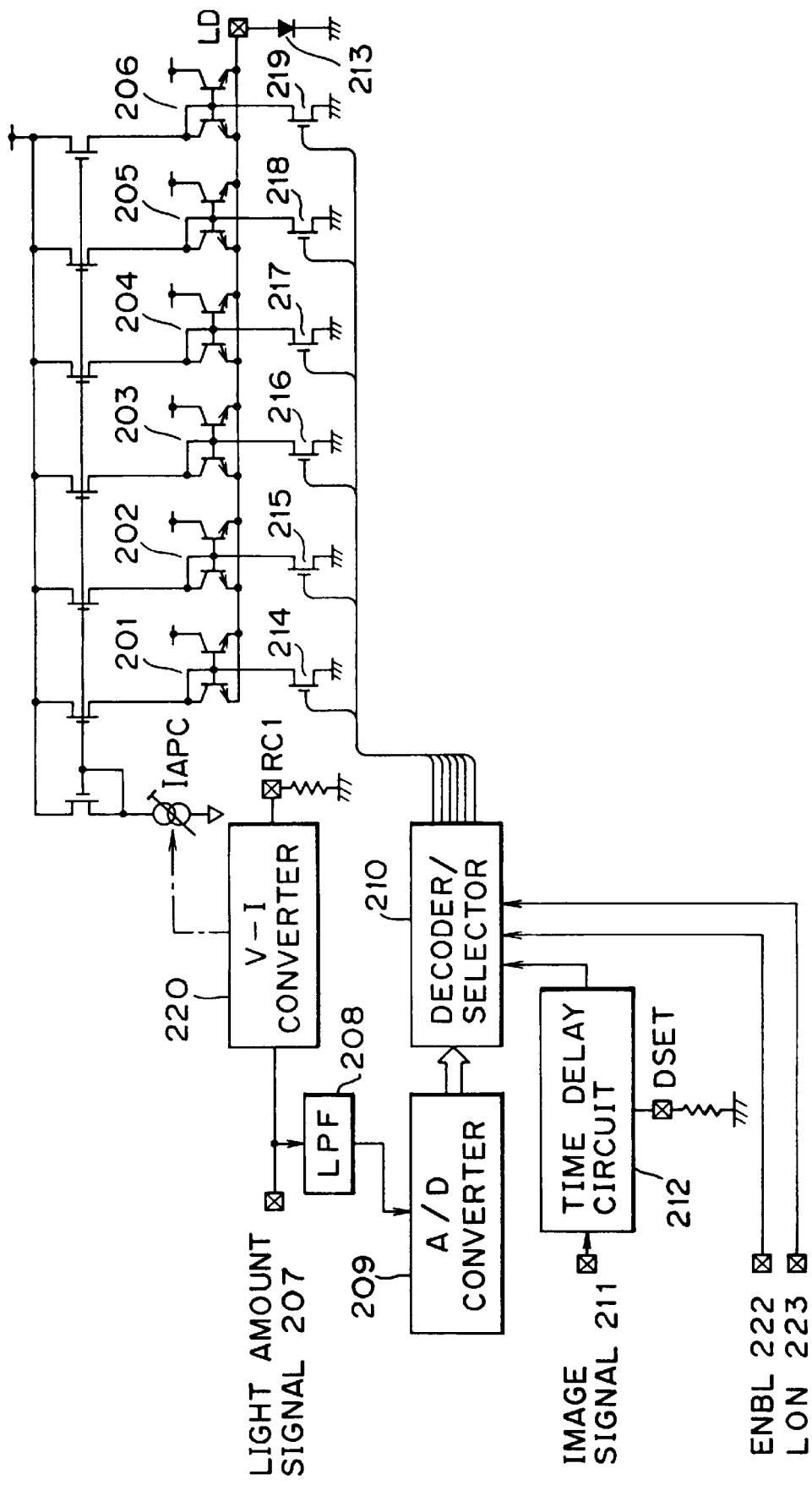
FIG. 11 is a block diagram showing the schematic circuit construction of a laser diode driving circuit in accordance with a first embodiment of the present invention.

FIG. 11 shows the outlined circuit diagram for a laser diode driving circuit in accordance with a first embodiment of the present invention. In the instant embodiment, an APC voltage 207 as explained with respect to the prior art is analog-to-digital converted to generate a light amount signal. In response to the value of the light amount signal, a decoder 210 selects one of a plurality of semiconductor cells 201 to 206 on driving stages and uses it, thereby accomplishing an optimal drive for a laser diode 213. Since an explanation for an electrophotographic type recording apparatus is the same as in the aforementioned prior art, the present embodiment focuses on an explanation for the end-driving stage of the laser diode.

The end-driving stage of the laser diode has six output stage cells 201 to 206 with optimized characteristic properties, including speed characteristics, ringing response characteristics, linearity characteristics and the like. These cells 201 to 206 have those characteristics optimized in driving current ranges, 0 to 20 mA, 20 to 40 mA, 40 to 60 mA, 60 to 80 mA, 80 to 100 mA, and 100 to 120 mA, respectively.

Figure 6:
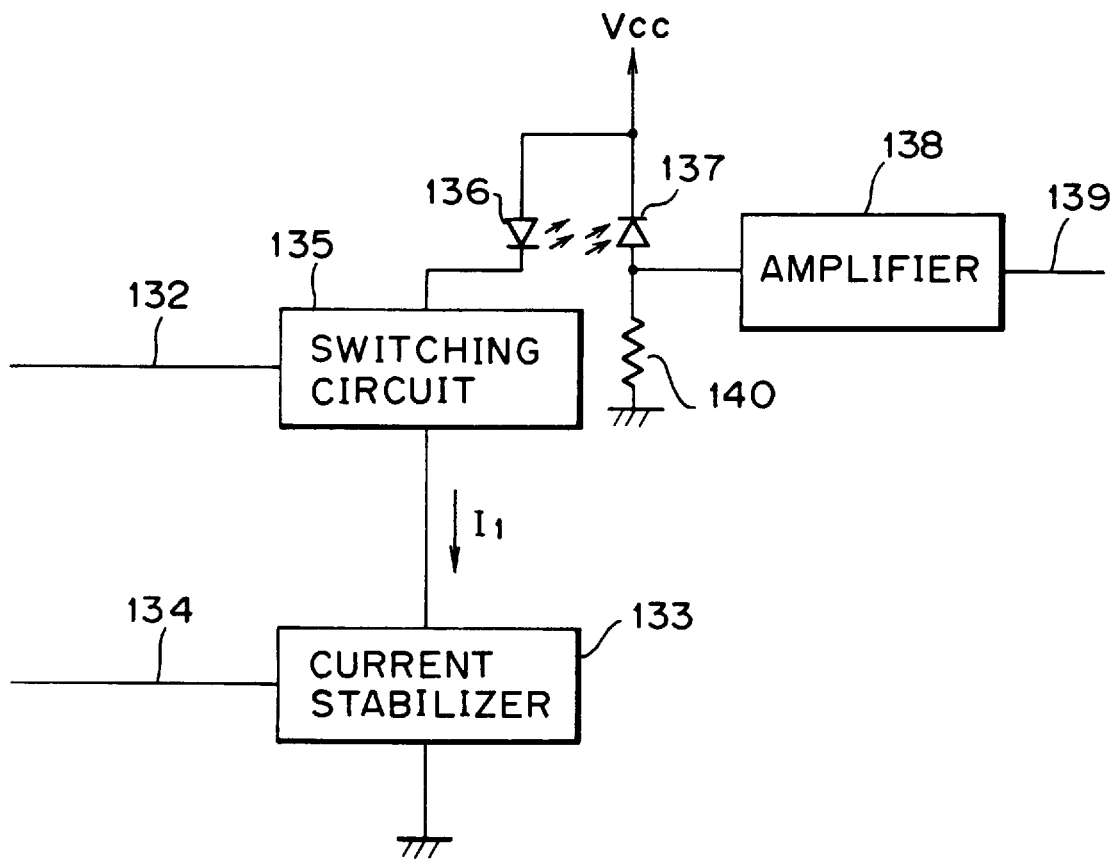
FIG. 6 is a circuit diagram showing the structure of a driving controller for the laser diode in the conventional laser beam printer shown in FIG. 1.
Figure 7:
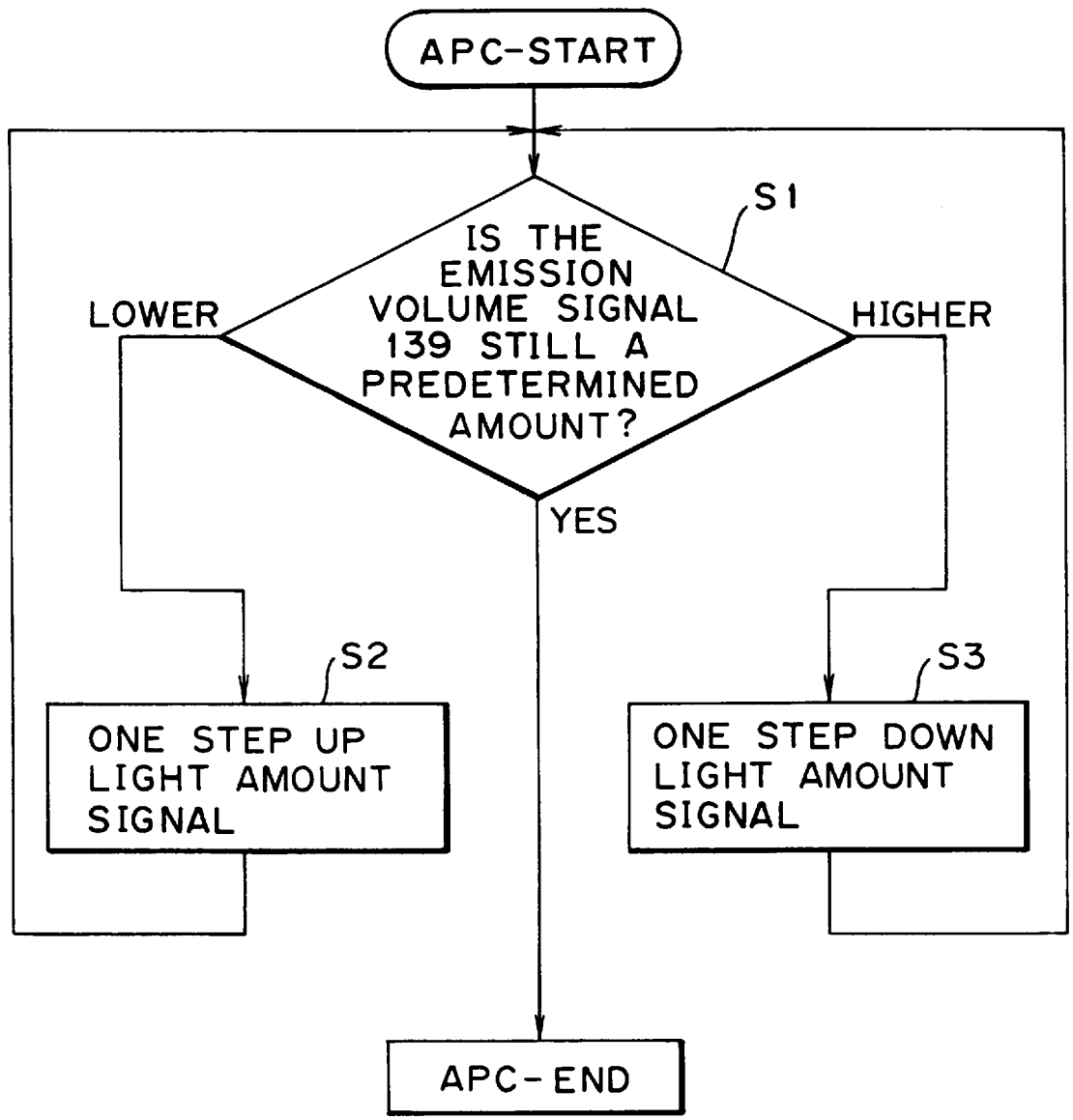
FIG. 7 is a flow chart showing the control procedure of the APC in the conventional laser beam printer shown in FIG. 1.
Figure 8:
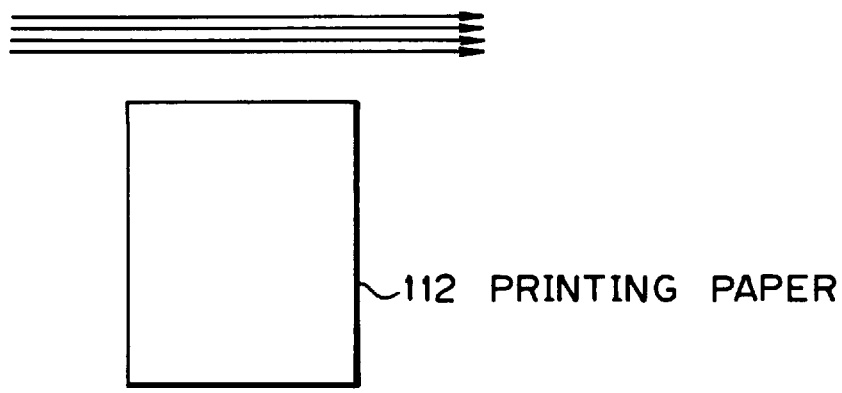
FIG. 8 is a schematic view showing the scanning position of laser beam during the APC in the conventional laser beam printer shown in FIG. 1.
Figure 9:
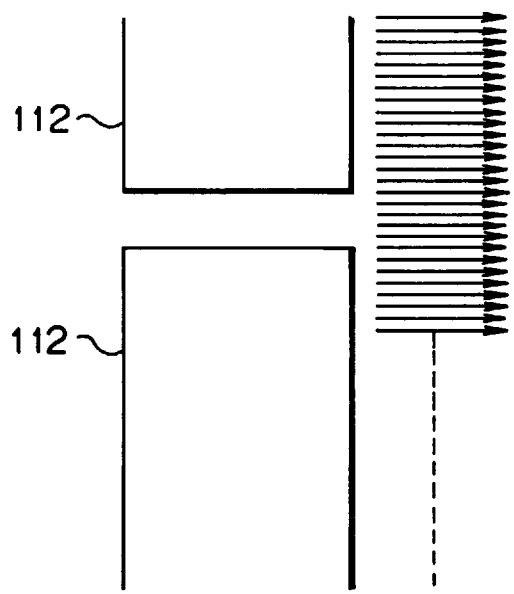
FIG. 9 is a schematic view showing another example of the scanning position of laser beam during the APC in the conventional laser beam printer shown in FIG. 1.
Figure 10:
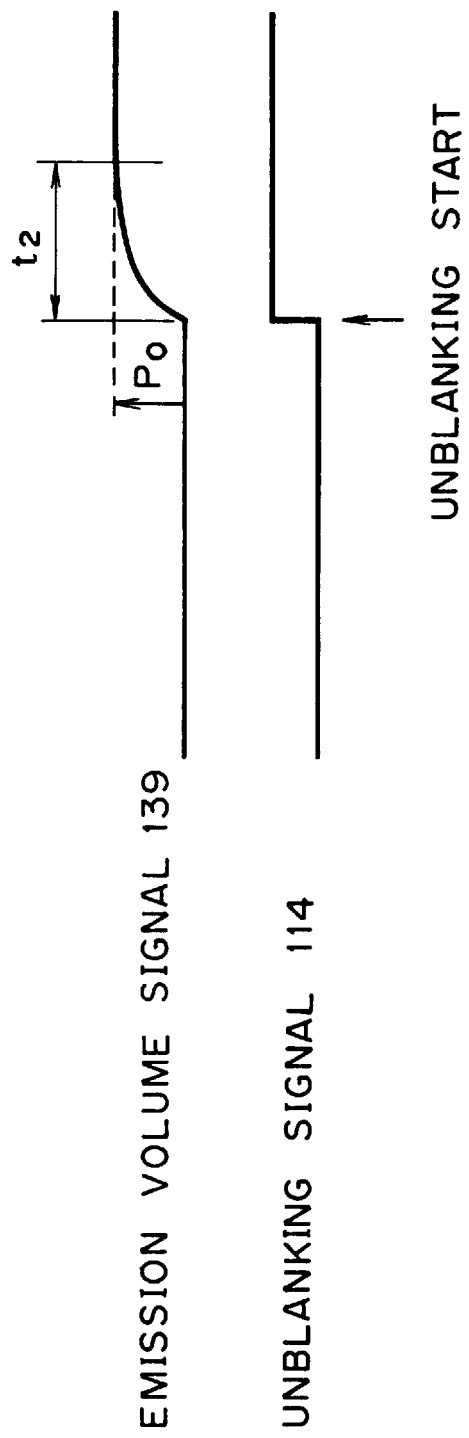
FIG. 10 is a waveform diagram showing the output timing and waveform of the emission volume signal in a conventional laser beam printer.

First, the light amount signal (APC voltage) 207 from a controller (not shown), which is comparable to the light amount signal 134 shown in FIG. 6, enters an analog-to-digital (A/D) converter 209 via a low pass filter (LPF) 208. The APC level of the light amount signal A/D converted by the A/D converter is decoded into one of the corresponding digital values preset by a decoder of decoder/selector 210. Based on this digital value decoded, the selector of decoder/selector 210 elects one of the above-mentioned cells 201 to 206.

Figure 5:
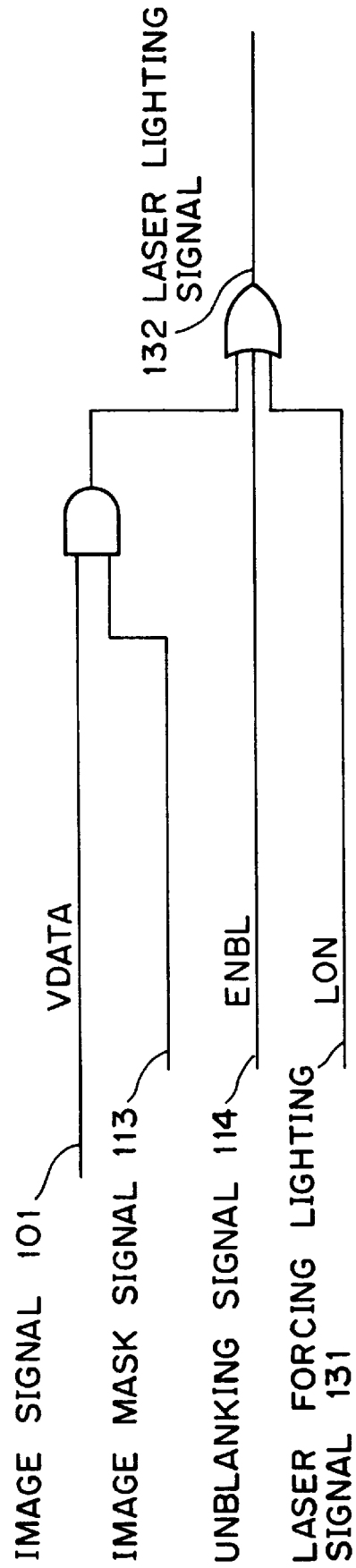
FIG. 5 is a circuit diagram showing the structure of a lighting signal generator for a laser diode in the conventional laser beam printer shown in FIG. 1.

Image signal (VDATA) 211 ON-OFF modulated based on the video signal, which image signal is comparable to the image signal 101 shown in FIG. 5, passes through a time delay circuit (TIME D) 212 for correcting the pulse duty ratio, whereby the pulse duty ratio of the ON-OFF modulated image signal 211 is corrected.

Then, the signal 211 with a corrected pulse duty ratio is put out from the time delay circuit 212 as a logical product signal with respect to a selection signal of the selector 210 so as to be output as a gate input to field effect transistors (FET) 214 to 219 in charge of the ON-OFF control of the transistors 201 to 206 driving the laser diode 213. For this purpose, the selector 210 has a logical circuit similar to that of FIG. 5.

On the other hand, in order to supply an appropriate driving current to the laser diode 213 in response to the voltage volume of the light amount signal 207, a constant-current source current $I_{APC}$ is determined by a voltage-current converter (V-I converter) 220 in response to that voltage volume. Symbol RC1 denotes a resistor for determining a reference voltage to be used in the voltage-current conversion by the converter 220. As a result, a driving current flows into the laser diode 213 via one of the output stage cells 201 to 206 which has been selected according to the current range for driving the laser diode 213 and whose characteristics mentioned above have been optimized.

The instant embodiment adopts a construction in which the pulse duty ratio of the ON-OFF modulated image signal 211 is corrected by passing this signal through the time delay circuit 212 for pulse duty ratio correction. This construction is not necessarily indispensable, for example, the image signal 211 may enter directly into the decoder/selector circuit 210.

This embodiment also adopts a layout of six output stage cells 201 to 206, however the present invention is not limited thereto. If cells with a wider current range are used, the invention may be constructed of a slightly smaller number of cells. If cells with a narrower current range are used, the invention may be constructed of a slightly larger number of cells.

<Modification of the first embodiment>

Figure 1:
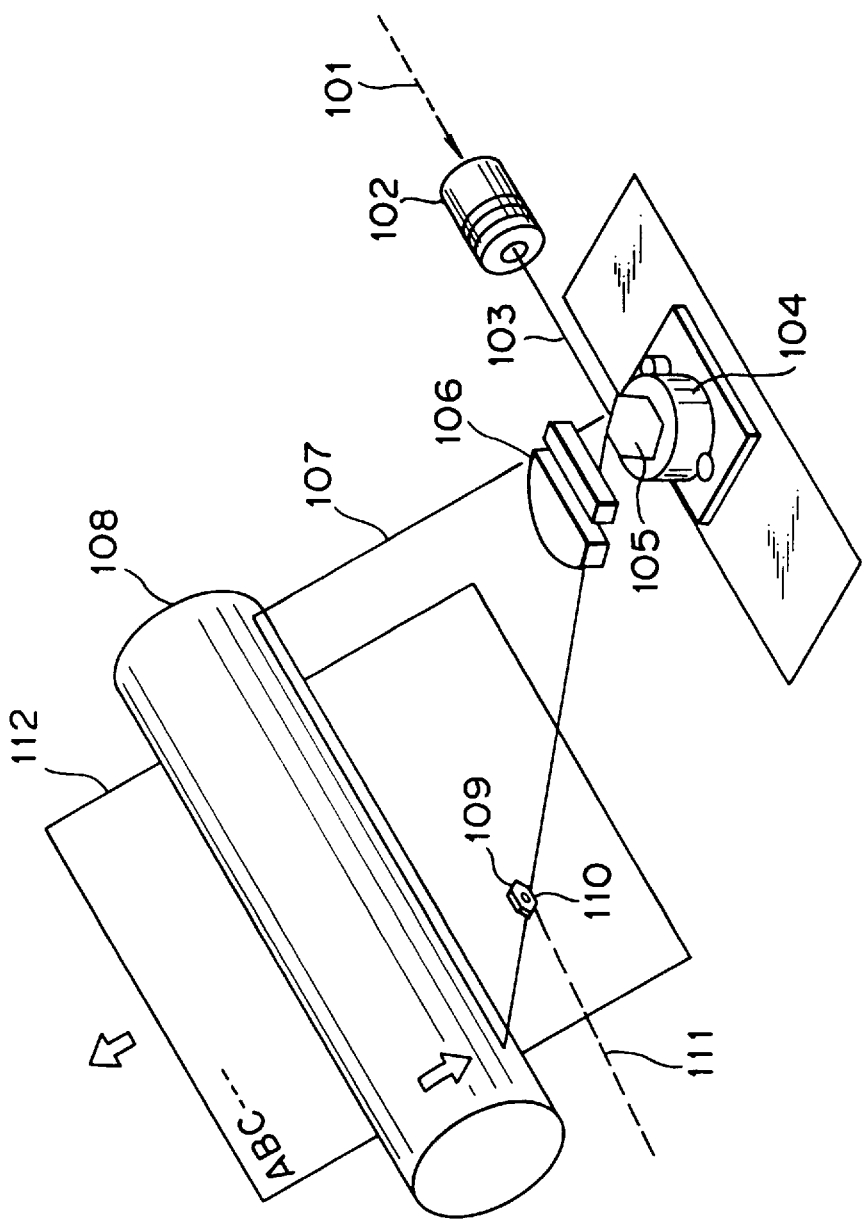
FIG. 1 is a perspective view showing the structure of a conventional laser beam printer.
Figure 2:
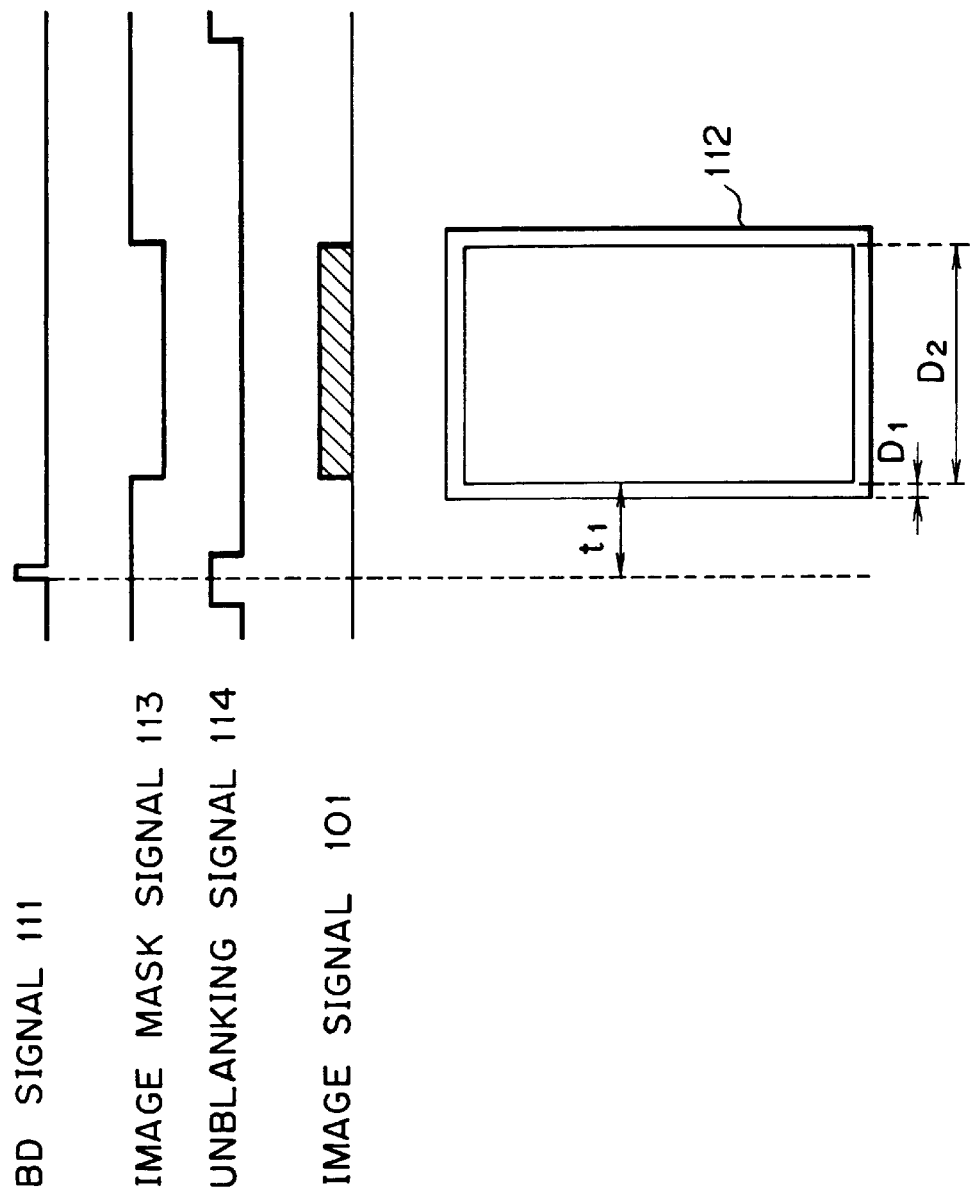
FIG. 2 is a timing chart for signals related to image formation in the conventional laser beam printer shown in FIG. 1.
Figure 3:
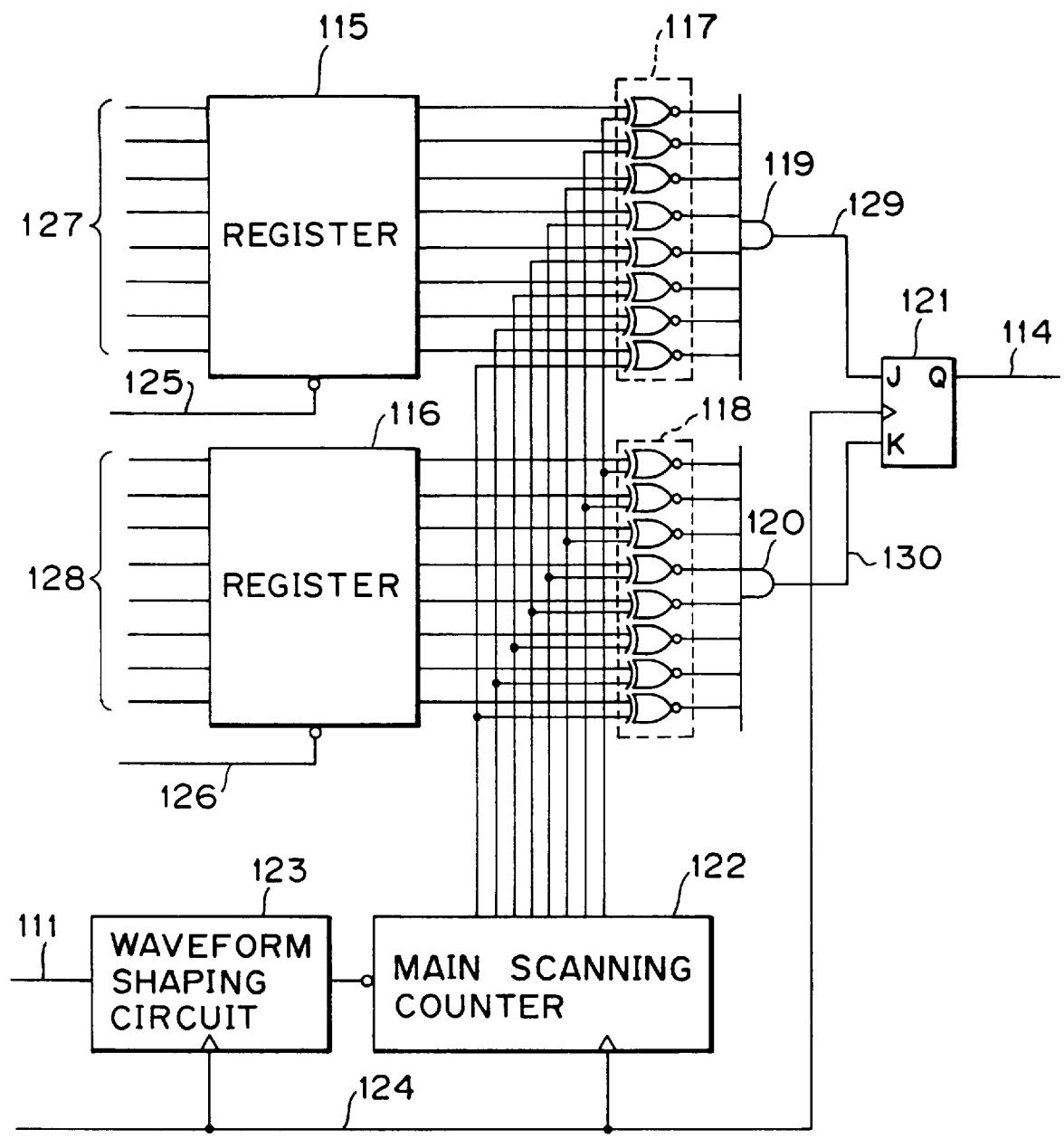
FIG. 3 is a circuit diagram showing the structure of an unblanking signal generator in the conventional laser beam printer shown in FIG. 1.
Figure 4:
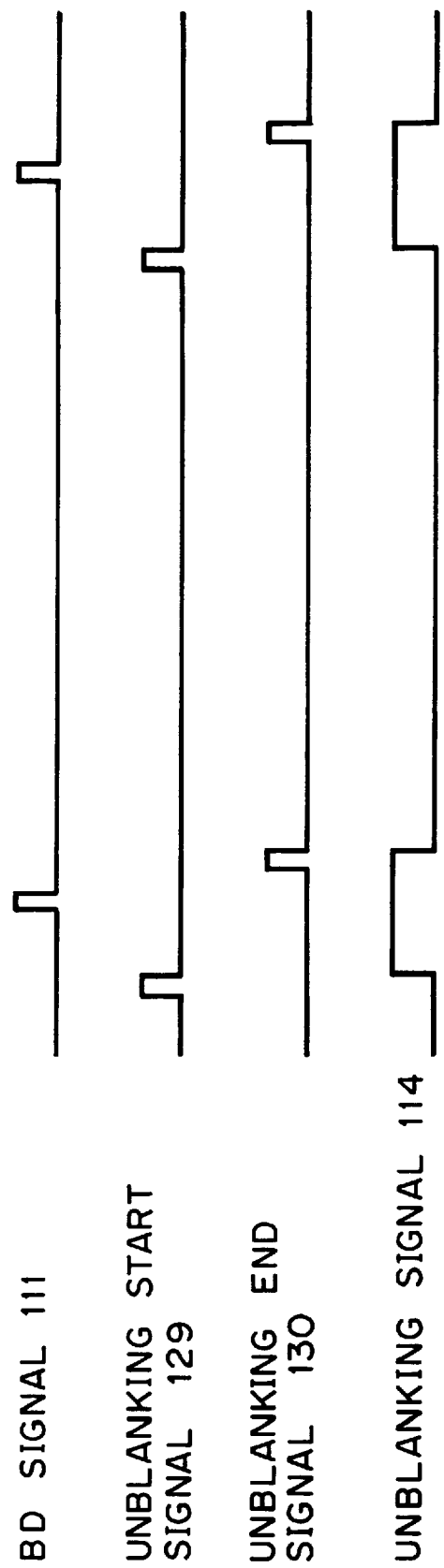
FIG. 4 is a timing chart showing the actions of the unblanking signal generator shown in FIG. 3.
Figure 12:
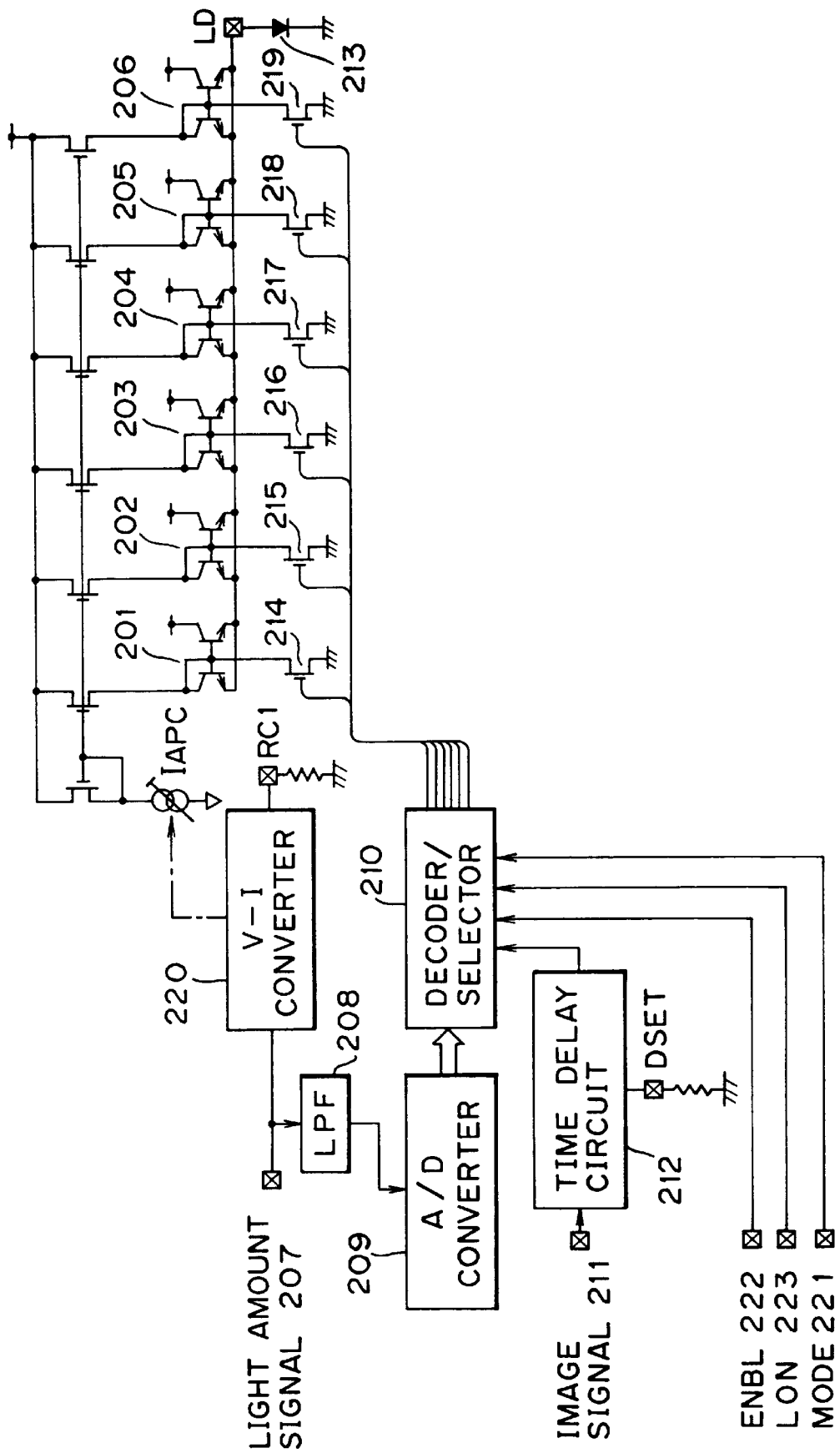
FIG. 12 is a block diagram showing the circuit structure of a laser diode driving circuit in accordance with a modification of the first embodiment of the present invention.

FIG. 12 shows a circuit structure as an example of the modification of the circuit in accordance with the first embodiment shown in FIG. 11. Numeral 221 denotes a control signal (MODE) for instructing the rejection of the change of selection about the cells 201 to 206 and for retaining the aforementioned selection signal shown in FIG. 11, and this signal 221 is supplied to the decoder/selector 210. This control signal 221 is fixed at least to some time equivalent to the image data recording time in the sub-scanning range shown in FIG. 2. In order to supply an appropriate driving current to the laser diode 213 in response to the voltage volume of the light amount signal 207, a constant-current source current $I_{APC}$ is determined by the voltage-current converter (V-I converter) 220 in response to the voltage volume of the light amount signal 207. Symbol RC1 denotes a resistor for determining a reference voltage to be used in the voltage-current conversion by the converter 220. Since the selection signal is held as stated above, malfunction due to noises, etc. can be avoided, and the employable driving cell is fixed during the control of recording onto the recording medium. Furthermore, a driving current flows into the laser diode 213 via one cell selected from among the output stage cells 201 to 206 whose characteristics have been optimized beforehand according to the range of current for driving the laser diode 213.

Figure 13:
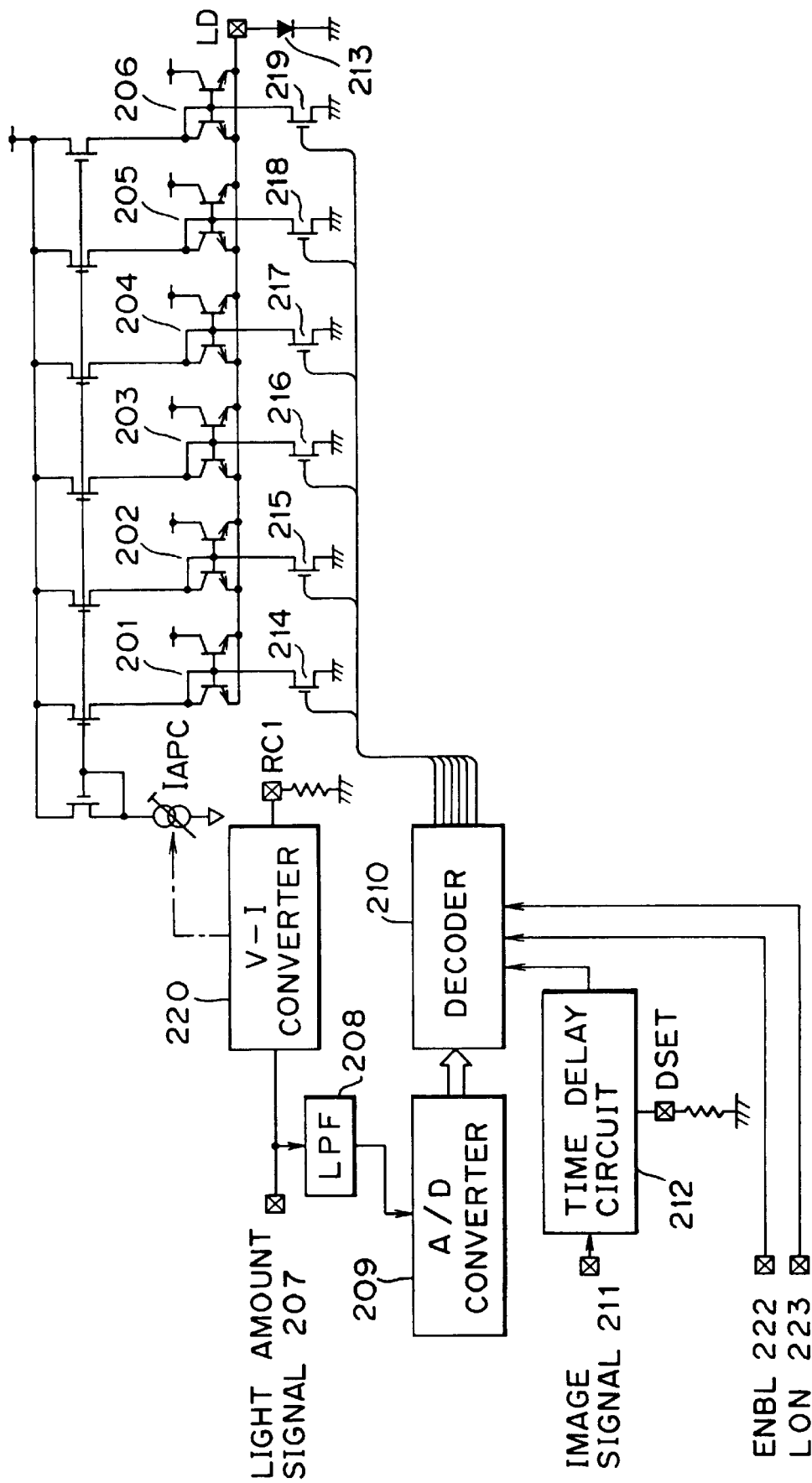
FIG. 13 is a block diagram showing the circuit structure of a laser diode driving circuit in accordance with another modification of the first embodiment of the present invention.

FIG. 13 shows a circuit structure as another modification of the circuit shown in FIG. 11. In this case, output stage cells 201 to 206 are each constituted of the same cell with common characteristics. Their characteristics, including speed characteristics, ringing response characteristics, and linearity characteristics, etc. are optimized beforehand in the driving current range of 0 to 20 mA. Numeral 210 denotes only a decoder, which uses one or more of cells optionally selected with combination from among plurality of the cells 201 to 206 in response to the value of the driving current to be supplied to the laser diode 213.

<Second embodiment>

Figure 14:
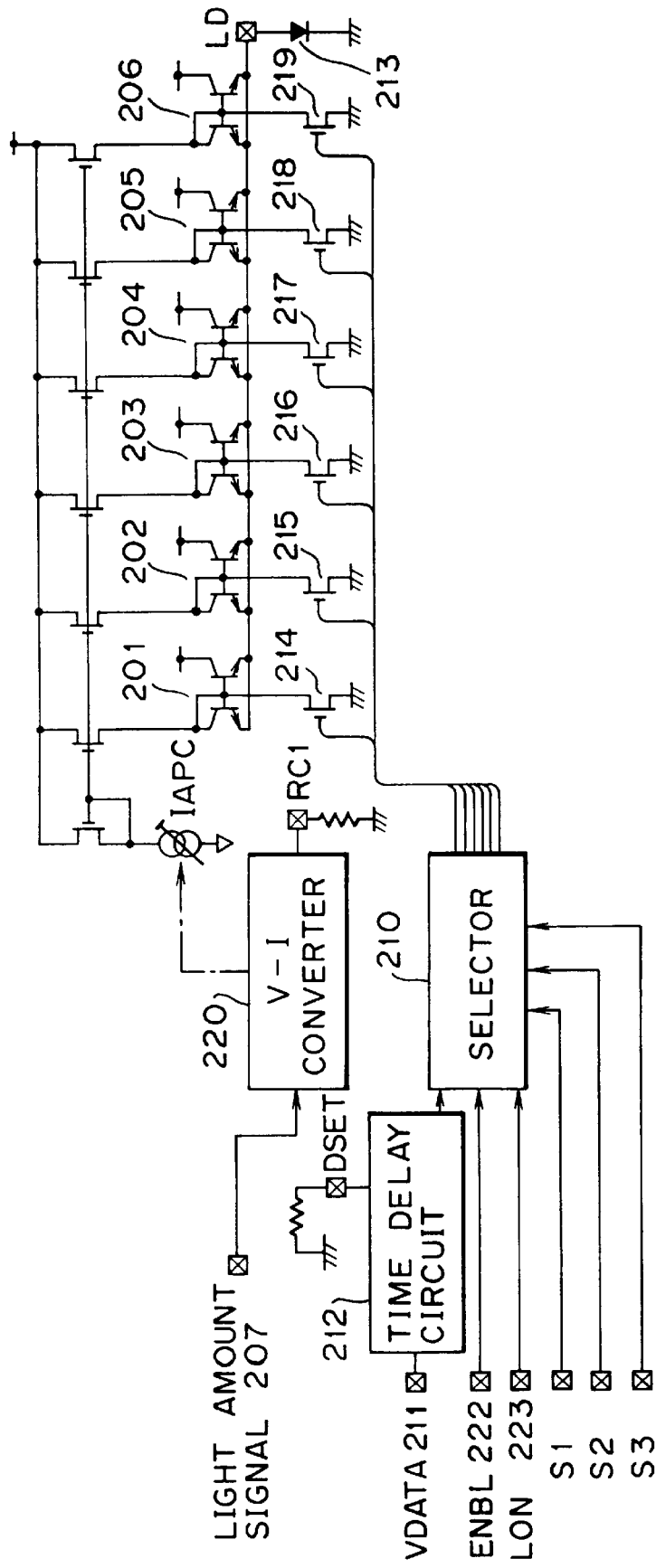
FIG. 14 is a block diagram showing the circuit structure of a laser diode driving circuit in accordance with a second embodiment of the present invention.

FIG. 14 shows the outlined circuit diagram for structure of a laser diode driving circuit in accordance with a second embodiment of the present invention. In the instant embodiment, a plurality of output stage cell selection signals S1, S2, S3 from a controller (not shown) select one of driving stage semiconductor cells 201 to 206 through a selector 210, thereby accomplishing an optimal drive of laser diode 213. This embodiment focuses on an explanation for portions different from the first embodiment. The output stage cell selection signals S1, S2, S3 are usually generated by the controller (not shown) for controlling the printer engine. When the control device determines the aforementioned APC voltage (207), then the device determines the output stage cell selection signals S1, S2, S3 by table look-up or the like according to the value of the APC voltage determined. Since the APC voltage corresponds to the driving current for the laser diode, some one of the six driving cells can be selected with the 3-bit digital signals S1 to S3.

<Third embodiment>

Figure 15:
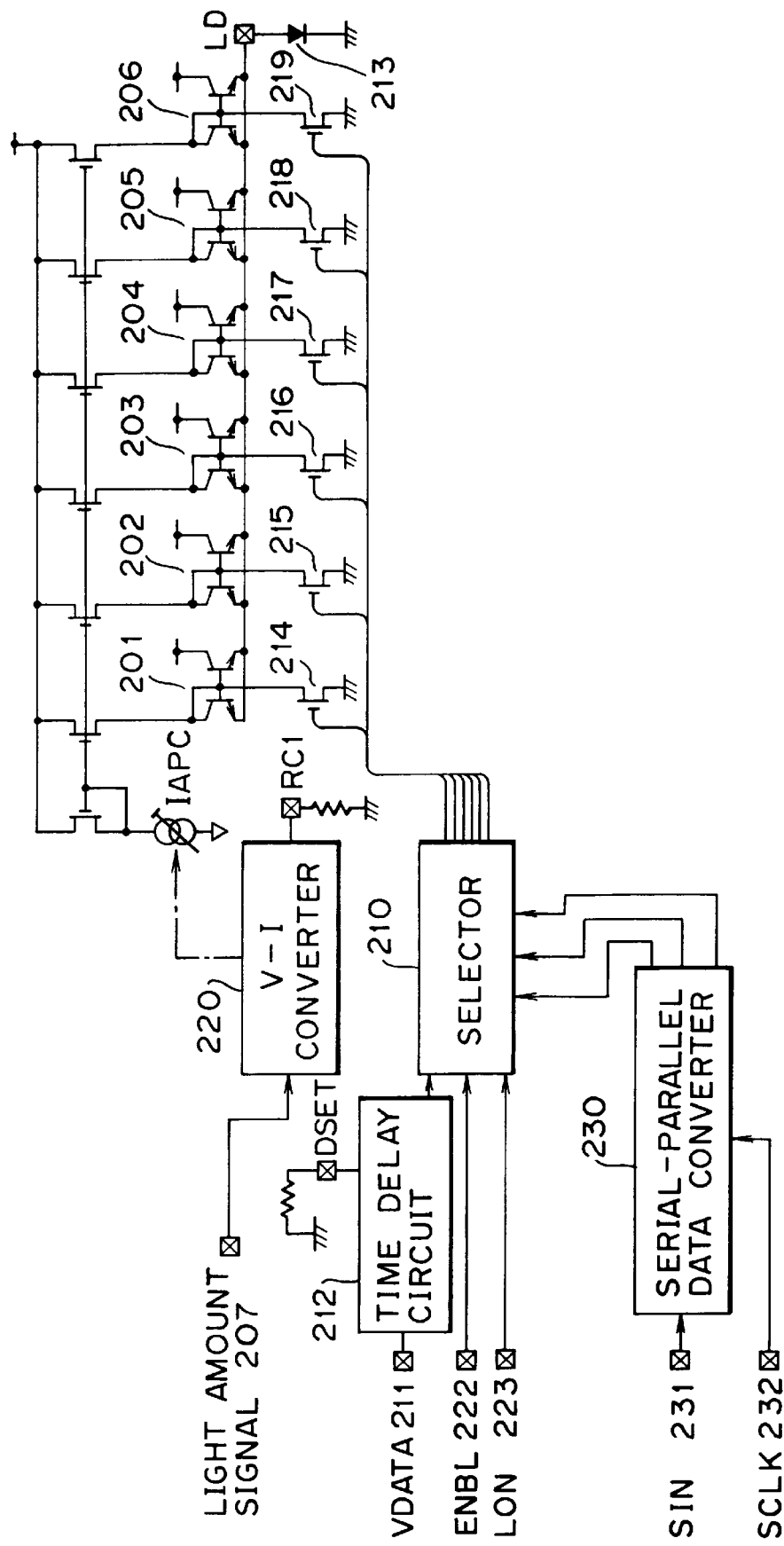
FIG. 15 is a block diagram showing the circuit structure of a laser diode driving circuit in accordance with a third embodiment of the present invention.

FIG. 15 shows the outlined circuit diagram for a laser diode driving circuit in accordance with a third embodiment of the present invention. In the instant embodiment, an output stage cell selection signal as serial data (SIN) 231 from a controller (not shown) becomes a parallel signal in a serial-parallel data converter 230. This parallel signal selects one of driving stage semiconductor cells 201 to 206 through the selector 210 as described in the second embodiment, thereby accomplishing an optimal drive of laser diode 213.

This embodiment focuses on an explanation for portions different from the second embodiment. The parallel signal for the output stage cell selection is usually generated by serial-parallel data converter 230 based on the serial data (SIN) 231 from the controller (not shown) for controlling the printer engine, and a synchronizing clock (SCLK) for this serial data. Therefore, the present embodiment enables control without need to increase selection signals, if there are more cells of which selection should be made.

The present invention has been described in detail with respect to preferred embodiments, and it will now be obvious that changes and modifications may be made without departing from the invention in its broader aspects, and it is our intention, therefore, in the appended claims to cover all such changes and modifications as fall within the true spirit of the invention.

What is claimed is:

1. An image forming apparatus having one separate LED, for generating a light beam, comprising:

a plurality of current mirror circuits, each of which generates a driving current supplied to said one separate LED;

a plurality of switching means corresponding to said plurality of current mirror circuits, respectively, each of said plurality of switching means being provided for switching the driving current which is generated by the corresponding current mirror circuit and supplied to said one separate LED; and control means for causing one or more of said plurality of switching means to perform a switching operation in response to an image signal.

2. An image forming apparatus as claimed in claim 1, wherein said control means for causing a switching operation of one or more of said plurality of switching means selects said one or more switching means in accordance with the driving current supplied to said one separated LED.

3. An image forming apparatus as claimed in claim 2, wherein each of said plurality of current mirror circuits has a different characteristic corresponding to a different driving current, and said control means causes a switching operation of one switching means corresponding to one current mirror circuit having a characteristic corresponding to the driving current supplied to said one separated LED.

4. An image forming apparatus as claimed in claim 1, further comprising means for correcting the pulse duty ratio of the image signal.

5. An image forming apparatus as claimed in claim 1, wherein said one separated LED source is a laser diode.

6. An image forming apparatus as claimed in claim 1, further comprising:

means for detecting a light intensity of the light beam from said one separate LED; and means for generating a control signal for controlling the driving current supplied to said one separate LED in accordance with the light intensity detected;

wherein said control means causes a switching operation of one or more of said plurality of switching means selected in accordance with the control signal.

7. An image forming apparatus as claimed in claim 6, further comprising means for analog-to-digital converting the control signal.

8. An image forming apparatus as claimed in claim 1, further comprising:

means for generating a selection signal for selecting one or more of said plurality of switching means as a serial signal; and means for converting the serial signal into a parallel signal;

wherein said control means causes a switching operation of one or more of said plurality of switching means selected in accordance with the parallel signal.

9. An image forming apparatus as claimed in claim 1, wherein an image is formed electrophotographically.

10. An image forming apparatus as claimed in claim 2, wherein each of said plurality of current mirror circuits has the same characteristic, and said control means causes switching operations of the number of switching means based upon the driving current supplied to said one separated LED.

11. A controller for one separate LED comprising:

a plurality of current mirror circuits, each generating a driving current supplied to said one separate LED;

a plurality of switching means corresponding to said plurality of current mirror circuits, respectively, each of said plurality of switching means being provided for switching the driving current which is generated by the corresponding current mirror circuit and supplied to said one separate LED; and control means for causing one or more of said plurality of switching means to perform a switching operation in response to an information signal.

12. A controller as claimed in claim 11, wherein said control means for causing a switching operation of one or more of said plurality of switching means selects said one or more switching means in accordance with the driving current supplied to said one separate LED.

13. A controller as claimed in claim 12, wherein each of said plurality of current mirror circuits has a different characteristic corresponding to a different driving current, and said control means causes a switching operation of one switching means corresponding to one current mirror circuit having a characteristic corresponding to the driving current supplied to said one separate LED.

14. A controller as claimed in claim 11, further comprising means for correcting the pulse duty ratio of the information signal.

15. A controller as claimed in claim 11, wherein said one separate LED is a laser diode.

16. A controller as claimed in claim 11, further comprising:

means for detecting a light intensity of the light beam from said one separate LED; and means for generating a control signal for controlling the driving current supplied to said one separate LED in accordance with the light intensity detected;

wherein said control means causes a switching operation of one or more of said plurality of switching means selected in accordance with the control signal.

17. A controller as claimed in claim 16, further comprising means for analog-to-digital converting the control signal.

18. A controller as claimed in claim 12, wherein each of said plurality of current mirror circuits has the same characteristic, and said control means causes switching operations of the number of switching means based upon the driving current supplied to said one separate LED.

19. An image forming apparatus comprising:

a light source, which is operable in an on-state or in an off-state on a bi-level basis during image formation;

a plurality of semiconductor cells, each of which generates a current; and switching means for switching the currents generated by said plurality of semiconductor cells to said light source so that a current suitable for turning on said light source can be supplied to said light source by supplying the sum of the currents generated by switched ones of said plurality of semiconductor cells.

20. An image forming apparatus as claimed in claim 19, wherein said light source is a laser diode.

21. An image forming apparatus as claimed in claim 19, wherein said switching means includes a respective plurality of switching elements corresponding to said plurality of semiconductor cells.

22. An image forming apparatus as claimed in claim 21, wherein said plurality of switching elements concurrently perform switching in response to an image signal.

23. An image forming apparatus as claimed in claim 19, wherein each of said semiconductor cells includes a current mirror circuit.

24. A light source controller for controlling a light source to be operable in an on-state or in an off-state on a bi-level basis during image formation, comprising:

a plurality of semiconductor cells, each of which generates a current; and switching means for switching the currents generated by said plurality of semiconductor cells to said light source sot that a current suitable for turning on said light source can be supplied to said light source by supplying the sum of the currents generated by switched ones of said plurality of semiconductor cells.

25. A light source controller as claimed in claim 24, wherein said light source is a laser diode.

26. A light source controller as claimed in claim 24, wherein said switching means includes a respective plurality of switching elements corresponding to said plurality of semiconductor cells.

27. A light source controller as claimed in claim 26, wherein said plurality of switching elements concurrently perform switching in response to an image signal.

28. A light source controller as claimed in claim 24, wherein each of said semiconductor cells includes a current mirror circuit.

* * * * *

UNITED STATES PATENT AND TRADEMARK OFFICE
CERTIFICATE OF CORRECTION

PATENT NO.  : 5,812,174

DATED        : September 22, 1998

INVENTOR(S): AKIO NOGUCHI ET AL.  Page 1 of 2

It is certified that error appears in the above-identified patent and that said Letters Patent is hereby corrected as shown below:

COLUMN 2

Line 10, "turn" should read --turns--.
    Line 11, "within" should be deleted.

COLUMN 3

Line 39, "an" should be deleted.
    Line 57, "arisen" should read --arises--.

COLUMN 4

Line 3, "notability," should read --notable,--.
    Line 11, "provide" should read --to provide--.
    Line 18, "provides;" should read --provides--.
    Line 24, "provides;" should read --provides--.

COLUMN 8

Line 41, "separated" should read --separate--.
    Line 48, "separated" should read --separate--.
    Line 53, "separated LED source" should read
      --separate LED--.

COLUMN 9

Line 18, "rated" should read --rate--.

UNITED STATES PATENT AND TRADEMARK OFFICE
CERTIFICATE OF CORRECTION

PATENT NO. : 5,812,174

DATED : September 22, 1998

INVENTOR(S) : AKIO NOGUCHI ET AL.

It is certified that error appears in the above-identified patent and that said Letters Patent is hereby corrected as shown below:

<u>COLUMN 10</u>

Line 41, "sot" should read --so--.

Signed and Sealed this

Twenty-second Day of June, 1999

Attest:

Q. TODD DICKINSON

*Attesting Officer*    Acting Commissioner of Patents and Trademarks